(12) United States Patent
Yamaguchi et al.

(10) Patent No.: US 11,177,721 B2
(45) Date of Patent: Nov. 16, 2021

(54) ROTATING ELECTRICAL MACHINE

(71) Applicant: HONDA MOTOR CO., LTD., Tokyo (JP)

(72) Inventors: Tadashi Yamaguchi, Saitama (JP); Takuro Kamada, Saitama (JP); Masahiko Mizuguchi, Saitama (JP); Kojiro Ohsaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 165 days.

(21) Appl. No.: 16/742,115

(22) Filed: Jan. 14, 2020

(65) Prior Publication Data
US 2020/0235641 A1     Jul. 23, 2020

(30) Foreign Application Priority Data

Jan. 17, 2019  (JP) .............................. JP2019-006058

(51) Int. Cl.
*H02K 1/32* (2006.01)
*H02K 9/00* (2006.01)
*H02K 1/22* (2006.01)

(52) U.S. Cl.
CPC ............... *H02K 9/00* (2013.01); *H02K 1/223* (2013.01); *H02K 2209/00* (2013.01)

(58) Field of Classification Search
CPC .......... H02K 1/32; H02K 1/20; H02K 1/2766; H02K 9/19
See application file for complete search history.

(56) References Cited

U.S. PATENT DOCUMENTS

| 6,772,504 B2 * | 8/2004 | Weidman | H02K 1/32 |
| | | | 29/598 |
| 8,674,574 B2 * | 3/2014 | Hayslett | H02K 1/2766 |
| | | | 310/156.57 |
| 9,030,062 B2 * | 5/2015 | Matsumoto | H02K 9/19 |
| | | | 310/43 |

(Continued)

FOREIGN PATENT DOCUMENTS

| JP | 2012-060843 A | 3/2012 |
| JP | 2018-033265 A | 3/2018 |

OTHER PUBLICATIONS

Oct. 20, 2020, Japanese Office Action issued for related JP Application No. 2019-006058.

*Primary Examiner* — Dang D Le
(74) *Attorney, Agent, or Firm* — Paratus Law Group, PLLC

(57) ABSTRACT

A rotating electrical machine includes a rotor and a stator. A first end plate includes a first refrigerant discharge hole which communicates with a second refrigerant flow path hole and supplies refrigerant to a first coil end and a first groove portion which supplies the refrigerant supplied from a refrigerant flow path to a first refrigerant flow path hole and does not supply the refrigerant to the first refrigerant discharge hole and the second refrigerant flow path hole. A second end plate includes a second refrigerant discharge hole which supplies the refrigerant to a second coil end and a second groove portion which supplies the refrigerant supplied from the first refrigerant flow path hole to the second refrigerant flow path hole and supplies the refrigerant to the second refrigerant discharge hole.

4 Claims, 6 Drawing Sheets

(56) References Cited

U.S. PATENT DOCUMENTS

| | | | |
|---|---|---|---|
| 2009/0261667 A1* | 10/2009 | Matsubara | H02K 1/2766 310/54 |
| 2018/0062463 A1 | 3/2018 | Ito et al. | |
| 2020/0127516 A1* | 4/2020 | Ohzu | H02K 1/30 |

* cited by examiner

ROTATING ELECTRICAL MACHINE

CROSS-REFERENCE TO RELATED APPLICATION(S)

This application claims priority from Japanese Patent Application No. 2019-006058 filed on Jan. 17, 2019, the entire contents of which are incorporated herein by reference.

FIELD

The present invention relates to a rotating electrical machine.

BACKGROUND

With the recent increase in size of rotating electrical machines, the deterioration of the performance of rotating electrical machines due to heat generation of a magnetic pole portion can no longer be ignored and a method for efficiently cooling the magnetic pole portion is being sought. In JP-A-2018-33265, a rotor of a rotating electrical machine including a rotor core and a pair of end surface plates disposed on both end surfaces of the rotor core, in which refrigerant supplied from a rotor shaft is introduced into the rotor core through an annular groove formed in one end surface plate and is discharged from the other end surface plate through a through hole formed in the rotor core, has been disclosed. As a result, the rotor core can be cooled from the inside.

In the rotating electrical machine, a coil of a stator also generates heat, so it is necessary to cool the coil of the stator at the same time. However, in the rotor of the rotating electrical machine described in JP-A-2018-33265, there is no description about a method for cooling the coil of the stator. In the rotor of the rotating electrical machine described in JP-A-2018-33265, even when the refrigerant discharged from the end surface plate is used to cool the coil of the stator, the refrigerant can only be supplied to a coil end located on an outer diameter side of the other end surface plate. As a result, there is a possibility that the coil of the stator cannot be cooled sufficiently.

SUMMARY

The invention provides a rotating electrical machine which can cool a magnetic pole portion of a rotor from the inside of a rotor core and can also cool a coil of a stator appropriately using refrigerant discharged from the rotor core.

According to the invention, there is provided a rotating electrical machine which includes a rotor and a stator arranged radially outside of the rotor, in which
 the rotor includes
 a rotor shaft including a refrigerant flow path inside of the rotor shaft,
 a rotor core including a rotor shaft hole through which the rotor shaft is inserted, a plurality of magnet insertion holes provided along a circumferential direction, and a first refrigerant flow path hole and a second refrigerant flow path hole penetrating in an axial direction,
 a plurality of magnetic pole portions constituted of magnets inserted into the magnet insertion holes,
 a first end plate arranged on a first axial end side of the rotor core, and
 a second end plate arranged on a second axial end side of the rotor core, opposite to the first axial end side,
 the stator includes
 a first coil end located radially outward of the first end plate, and
 a second coil end located radially outward of the second end plate,
 the first end plate includes,
 a first refrigerant discharge hole communicating with the second refrigerant flow path hole, and
 a first groove portion which supplies refrigerant supplied from the refrigerant flow path to the first refrigerant flow path hole and does not supply the refrigerant to the first refrigerant discharge hole and the second refrigerant flow path hole, and
 the second end plate includes,
 a second refrigerant discharge hole, and
 a second groove portion which supplies the refrigerant supplied from the first refrigerant flow path hole to the second refrigerant flow path hole and supplies the refrigerant to the second refrigerant discharge hole.

According to the invention, the rotor core can be cooled from the inside by the refrigerant supplied to the first refrigerant flow path and the second refrigerant flow path and the first coil end and the second coil end can be cooled by the refrigerant discharged from the first refrigerant discharge hole and the second refrigerant discharge hole.

DETAILED DESCRIPTION

Hereinafter, a rotating electrical machine according to an embodiment of the invention will be described with reference to the accompanying drawings.

Figure 1:
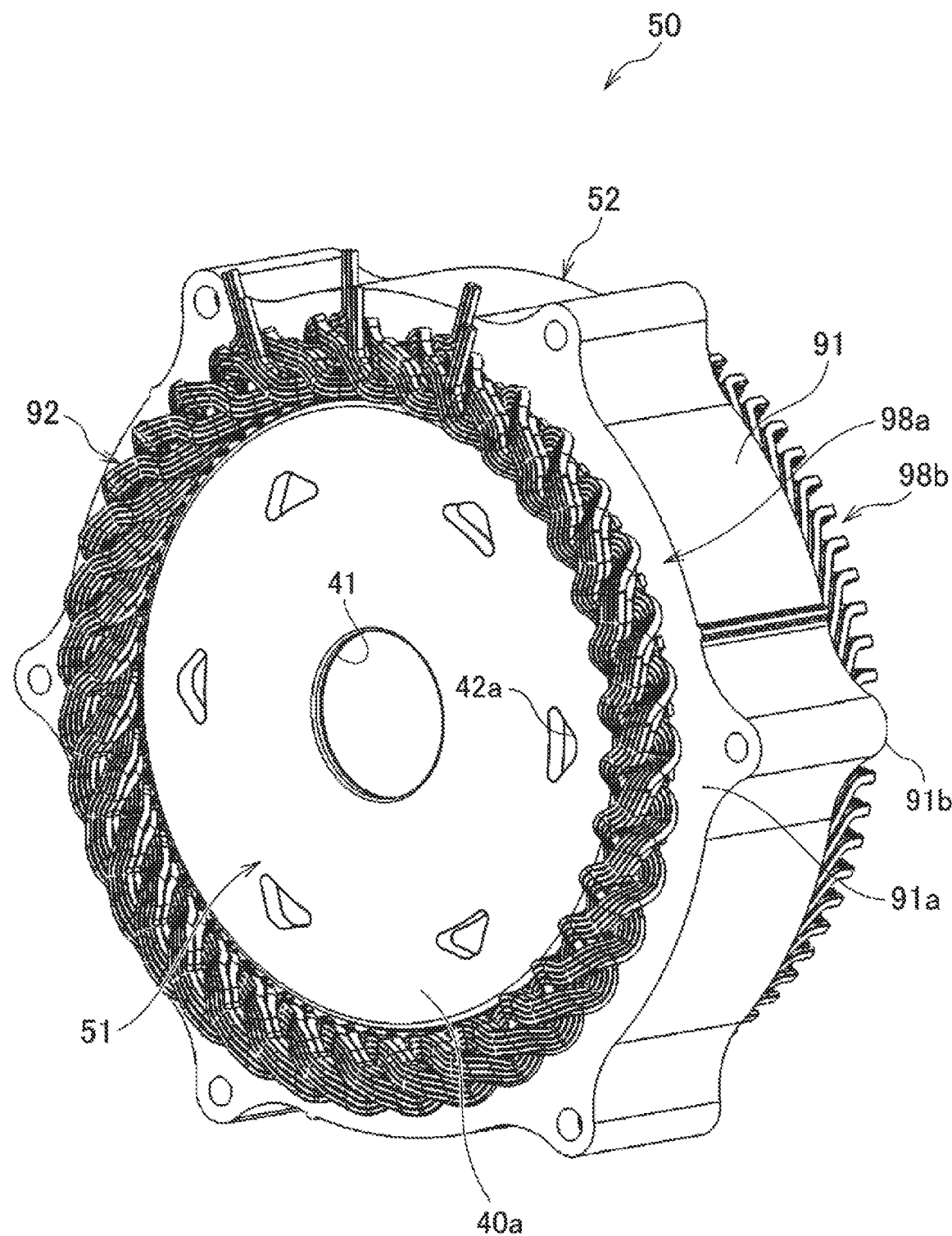
FIG. 1 is a perspective view of a rotating electrical machine according to an embodiment of the invention.

As illustrated in FIG. 1, a rotating electrical machine 50 is a so-called inner rotor type rotating electrical machine including a rotor 51 and a stator 52 arranged to face an outer diameter side of the rotor 51 with a slight gap.

[Rotor]

As illustrated in FIGS. 2 to 6, the rotor 51 of a first embodiment includes a rotor shaft 10, a rotor core 20 supported by the rotor shaft 10, a plurality of magnetic pole portions 30, a first end plate 40a disposed on one axial end side of the rotor core 20, and a second end plate 40b disposed on the other axial end side of the rotor core 20.

The rotor shaft 10 is formed with a refrigerant flow path 11 through which refrigerant flows. The refrigerant flow path 11 extends in an axial direction inside the rotor shaft 10 and is configured such that the refrigerant can be supplied from the outside. As the refrigerant, for example, automatic transmission fluid (ATF) is used. The refrigerant flow path 11 is connected to a circulation path formed in a housing (not illustrated) which accommodates the rotating electrical machine 50.

[Rotor Core]

For example, the rotor core 20 is formed by laminating a plurality of electromagnetic steel plates formed by press working in the axial direction and joining them by swaging or bonding.

The rotor core 20 includes a rotor shaft hole 21 through which the rotor shaft 10 is inserted, a cooling portion 22 provided outside the rotor shaft hole 21 in a radial direction, and an electromagnetic portion 23 provided outside the cooling portion 22 in the radial direction.

The electromagnetic portion 23 is disposed on the outer periphery of the rotor core 20 and faces the stator 52. In the electromagnetic portion 23, a plurality of magnetic pole portions 30 are formed at equal intervals along a circumferential direction. Each magnetic pole portion 30 is constituted of three magnets 31 inserted into three magnet insertion holes 24 arranged in a substantially arc shape protruding radially inward. The magnet 31 is a permanent magnet such as a neodymium magnet. The magnetic pole portion 30 may be constituted of two magnets arranged in two magnet insertion holes arranged in a substantially V shape which opens outward in the radial direction or may be constituted of one flat magnet or arc magnet.

The cooling portion 22 includes first refrigerant flow path holes 25 arranged at equal intervals along the circumferential direction, and second refrigerant flow path holes 26 and third refrigerant flow path holes 27 alternately disposed along the circumferential direction between the adjacent first refrigerant flow path holes 25. That is, the second refrigerant flow path hole 26 is provided in relation to the first refrigerant flow path hole 25 on one circumferential side with respect to one first refrigerant flow path hole 25 and the third refrigerant flow path hole 27 is provided in relation to the first refrigerant flow path hole 25 on the other circumferential side.

The first refrigerant flow path hole 25 is located on a d-axis connecting the center of each magnetic pole portion 30 and a center CL of the rotor 51. The second refrigerant flow path hole 26 is located on a q-axis passing through one circumferential end portion of each magnetic pole portion 30 and the center CL of the rotor 51. The third refrigerant flow path hole 27 is located on a q-axis passing through the other circumferential end portion of each magnetic pole portion 30 and the center CL of the rotor 51.

The first refrigerant flow path hole 25 has a substantially pentagonal shape including an apex portion protruding radially inward and includes an inner diameter side apex portion 25d protruding radially inward. The second refrigerant flow path hole 26 and the third refrigerant flow path hole 27 have the same shape. The second refrigerant flow path hole 26 and the third refrigerant flow path hole 27 have a substantially quadrangular shape which is convex on both sides in the circumferential direction and both sides in the radial direction and include inner diameter side apex portions 26d and 27d which protrude radially inward. The inner diameter side apex portions 26d and 27d of the second refrigerant flow path hole 26 and the third refrigerant flow path hole 27 are located further on the radially outer side than the inner diameter side apex 25d of the first reactant flow path hole 25. That is, in the cooling portion 22 of the rotor core 20, the inner diameter side top portion 25d of the first refrigerant flow path hole 25 is located on the innermost side in the radial direction. Outer diameter side apex portions 26e and 27e of the second refrigerant flow path hole 26 and the third refrigerant flow path hole 27 are located further on the outer side in the radial direction than an outermost diameter portion 25e of the first refrigerant flow path hole 25.

[End Plate]

Figure 2:
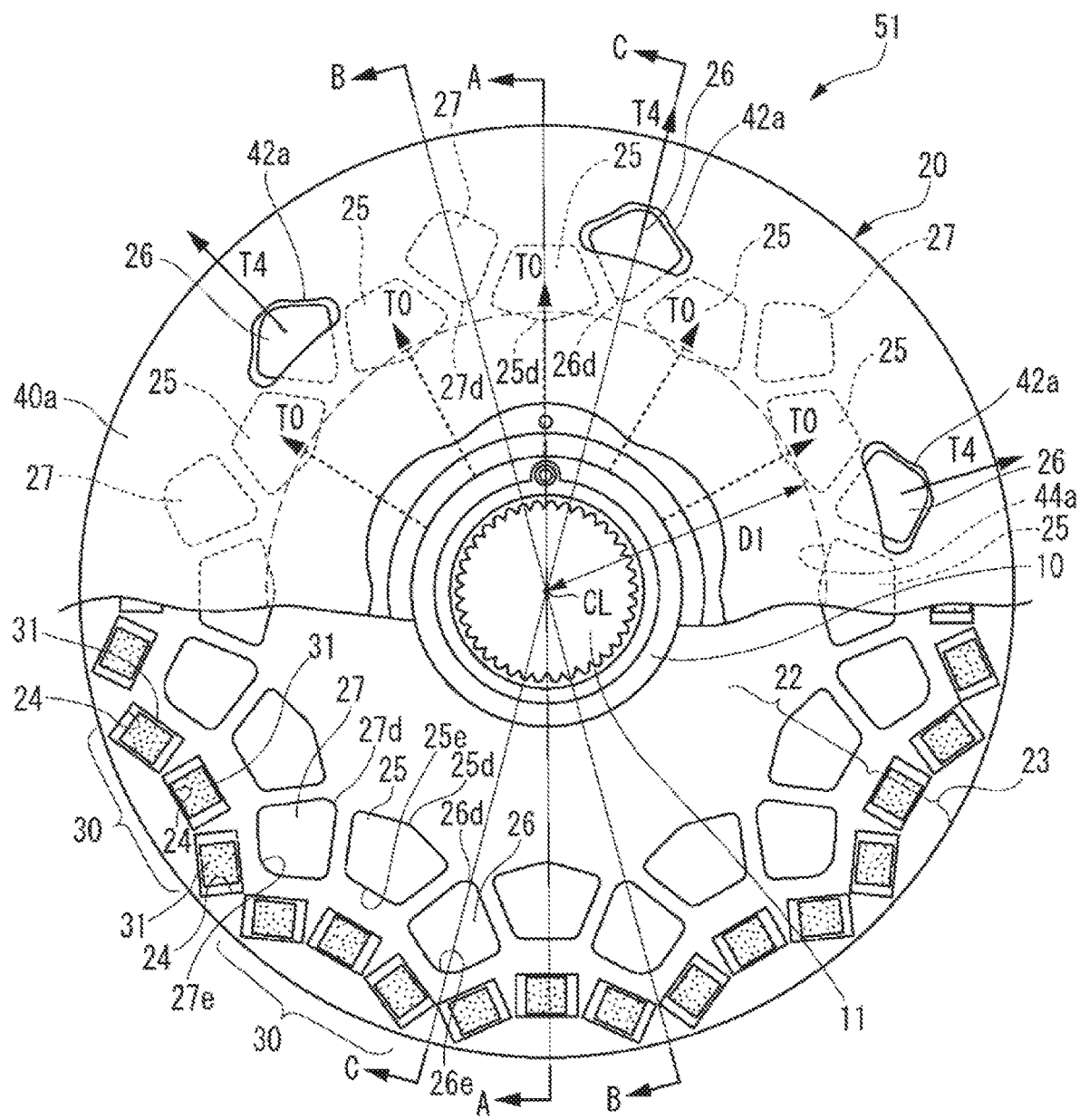
FIG. 2 is a front view of a rotor of the rotating electrical machine according to a first embodiment, with a part of a first end plate cut away.
Figure 6:
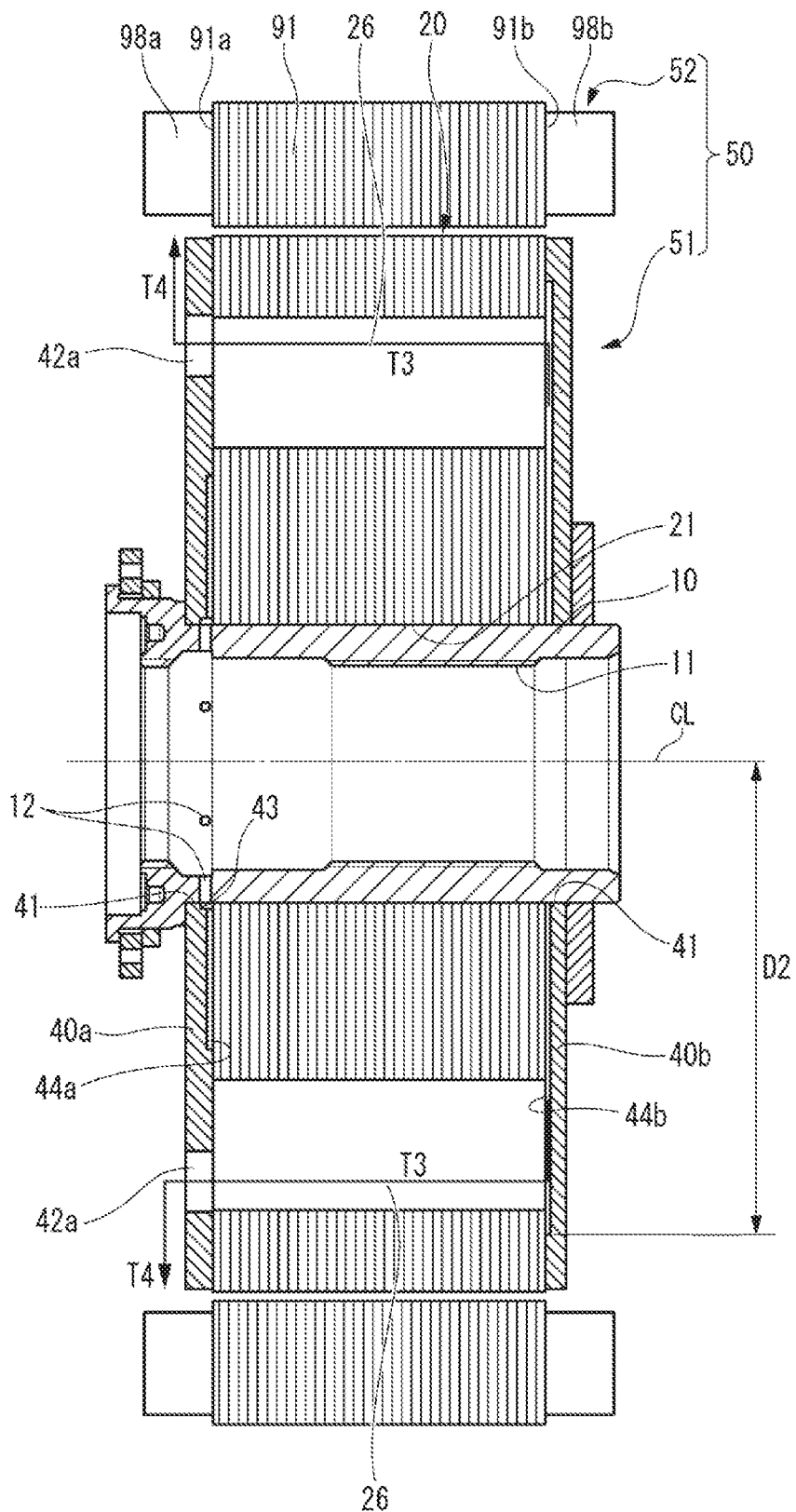
FIG. 6 is a cross-sectional view taken along the line C-C in FIGS. 2 and 3.

As illustrated in FIGS. 2 and 6, the first end plate 40a is disposed to face an end surface on one end side in the axial direction of the rotor core 20. An insertion hole 41 through which the rotor shaft 10 is inserted is formed in the center of the first end plate 40a. In a portion further on the outer side in the radial direction than the insertion hole 41, a plurality (six in the present embodiment) of first refrigerant discharge holes 42a are formed at equal intervals in the circumferential direction to overlap the second refrigerant flow path holes 26 formed in the rotor core 20 when viewed from the axial direction. That is, the first refrigerant discharge hole 42a communicates with the second refrigerant flow path hole 26.

On an inner surface of the first end plate 40a, an annular refrigerant introduction groove 43 communicating with the refrigerant flow path 12 formed in the rotor shaft 10 at the inner diameter side corner portion of the insertion hole 41 and an annular first groove portion 44a communicating with the refrigerant introduction groove 43 and communicating with the first refrigerant flow path hole 25 of the rotor core 20 are formed.

The first groove portion 44a is continuous from the refrigerant introduction groove 43. The first groove portion 44a is an annular concave groove having a radius D1 larger than the length from the center CL of the rotor 51 to the inner diameter side apex portion 25d of the first refrigerant flow path hole 25, smaller than the length form the center CL of the rotor 51 to the first refrigerant discharge hole 42a, and smaller than the length from the center CL of the rotor 51 to inner diameter side apex portions 26d and 27d of the second refrigerant flow path hole 26 and the third refrigerant flow path hole 27. Therefore, the first groove portion 44a supplies the refrigerant supplied from the refrigerant flow path 12 to the first refrigerant flow path hole 25 and does not directly supply the refrigerant to the first refrigerant discharge hole 42a, the second refrigerant flow path hole 26, and the third refrigerant flow path hole 27. The flow of the first refrigerant in the vicinity of the first groove portion 44a will be specifically described. The refrigerant flowing through the refrigerant flow path 11 is introduced from the refrigerant introduction groove 43 to the first groove portion 44a as indicated by an arrow T0 in FIGS. 2 and 4, and then the refrigerant is supplied from the first groove portion 44a to the first refrigerant flow path hole 25 of the rotor core 20. As indicated by an arrow T1 in FIG. 4, the refrigerant supplied to the first refrigerant flow path hole 25 flows through the first refrigerant flow path hole 25 in the axial direction from the first end plate 40a side to the second end plate 40b side, thereby cooling the magnet 31 disposed in each magnetic pole portion 30.

The second end plate 40b is disposed to face the end surface on the other axial end side of the rotor core 20. The insertion hole 41 for inserting the rotor shaft 10 is formed in the center of the second end plate 40b. In a portion further on the outer side in the radial direction than the insertion hole 41, a plurality (six in the present embodiment) of second refrigerant discharge holes 42b are formed at equal intervals in the circumferential direction to overlap with the third refrigerant flow path holes 27 formed in the rotor core 20 when viewed from the axial direction.

Therefore, the first refrigerant discharge hole 42a provided to overlap the second refrigerant flow path hole 26 in the circumferential direction and the second refrigerant discharge hole 42b provided to overlap the third refrigerant flow path hole 27 in the circumferential direction are alternately arranged in the circumferential direction when viewed from the axial direction. The first refrigerant flow path hole 25 is disposed between the first refrigerant discharge hole 42a and the second refrigerant discharge hole 42b in the circumferential direction when viewed from the axial direction.

On the inner surface of the second end plate 40b, a second groove portion 44b is formed which communicates with the first refrigerant flow path hole 25, the second refrigerant flow path hole 26, and the third refrigerant flow path hole 27 of the rotor core 20 and communicates with the second refrigerant discharge hole 42b of the second end plate 40b.

The second groove portion 44b is an annular concave groove which is continuous from the insertion hole 41 and has a radius D2 which is larger than the length from the center CL of the rotor 51 to the first refrigerant discharge hole 42a of the second end plate 40b. Therefore, the refrigerant supplied from the first refrigerant flow path hole 25 to the second groove portion 44b is discharged from the second refrigerant discharge hole 42b of the second end plate 40b as indicated by an arrow T2 in FIGS. 3 and 5. As indicated by an arrow T3 in FIG. 6, the refrigerant supplied from the first refrigerant flow path hole 25 to the second groove portion 44b is supplied to the second refrigerant flow path hole 26 of the rotor core 20 and flows through the second refrigerant flow path hole 26 in the axial direction from the second end plate 40b side to the first end plate 40a side, thereby cooling the magnet 31 disposed in each magnetic pole portion 30. The refrigerant which has flowed through the second refrigerant flow path hole 26 is discharged from the first refrigerant discharge hole 42a of the first end plate 40a as indicated by an arrow T4 in FIGS. 2 and 6.

The refrigerant discharge holes 42a and 42b of the first end plate 40a and the second end plate 40b both have a substantially triangular shape including an apex portion on the radially outer side. However, the shape of the refrigerant discharge holes 42a and 42b can be changed as appropriate.

[Stator]

The stator 52 includes a stator core 91 and a coil 92 wound around a plurality of slots formed in the stator core 91. The coil 92 includes a first coil end 98a which protrudes in the axial direction from one end surface 91a side of the stator core 91 and a second coil end 98b which protrudes in the axial direction from the other end surface 91b side of the stator core 91. The first coil end 98a is located on the radially outer side of the first end plate 40a and the second coil end 98b is located on the radially outer side of the second end plate 40b. Therefore, the refrigerant discharged from the first refrigerant discharge hole 42a of the first end plate 40a is supplied to the first coil end 98a and the refrigerant discharged from the second refrigerant discharge hole 42b of the second end plate 40b is supplied to the second coil end 98b.

[Cooling Action]

Next, the cooling action of the rotating electrical machine 50 will be described.

In the rotating electrical machine 50 of the embodiment, the refrigerant pumped by a refrigerant pump (not illustrated) is supplied to the rotor shaft 10 through a circulation path. The refrigerant supplied to the refrigerant flow path 11 is supplied to the refrigerant flow path 12 which passes through the rotor shaft 10 in the radial direction.

Figure 4:
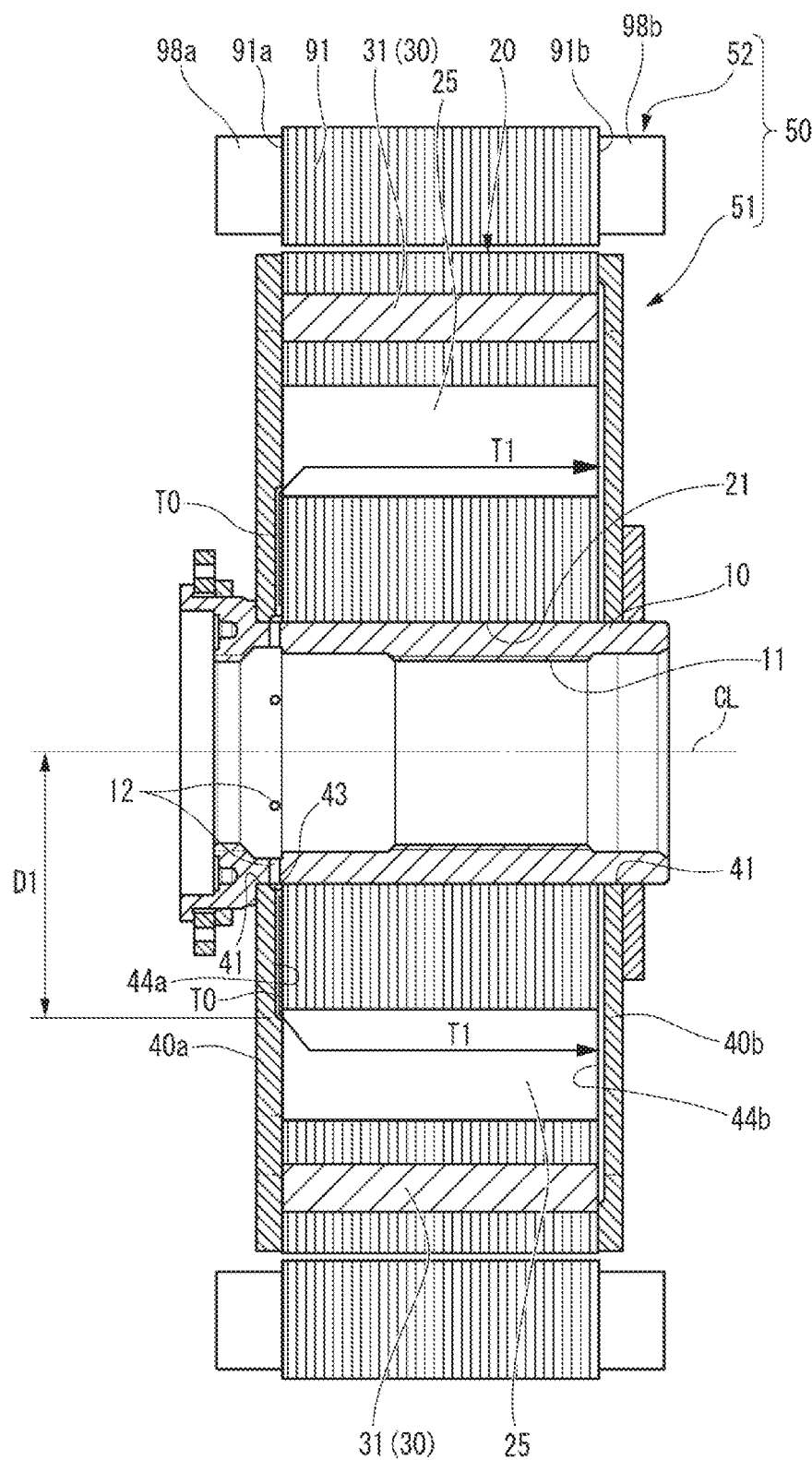
FIG. 4 is a cross-sectional view taken along the line A-A in FIGS. 2 and 3.

Due to the centrifugal force acting on the refrigerant, the refrigerant in the refrigerant flow path 12 passes through the refrigerant introduction groove 43 and the first groove portion 44a of the first end plate 40a as indicated by the arrow T0 in FIGS. 2 and 4 and is supplied to the first refrigerant flow path hole 25 of the rotor core 20. Then, the refrigerant flows through the first refrigerant flow path hole 25 as indicated by the arrow T1 in FIG. 4 to cool the rotor core 20 from the inside. Since the first refrigerant flow path hole 25 is disposed in the vicinity of the magnetic pole portion 30, the magnet 31 having the largest heat generation amount can be effectively cooled.

Figure 3:
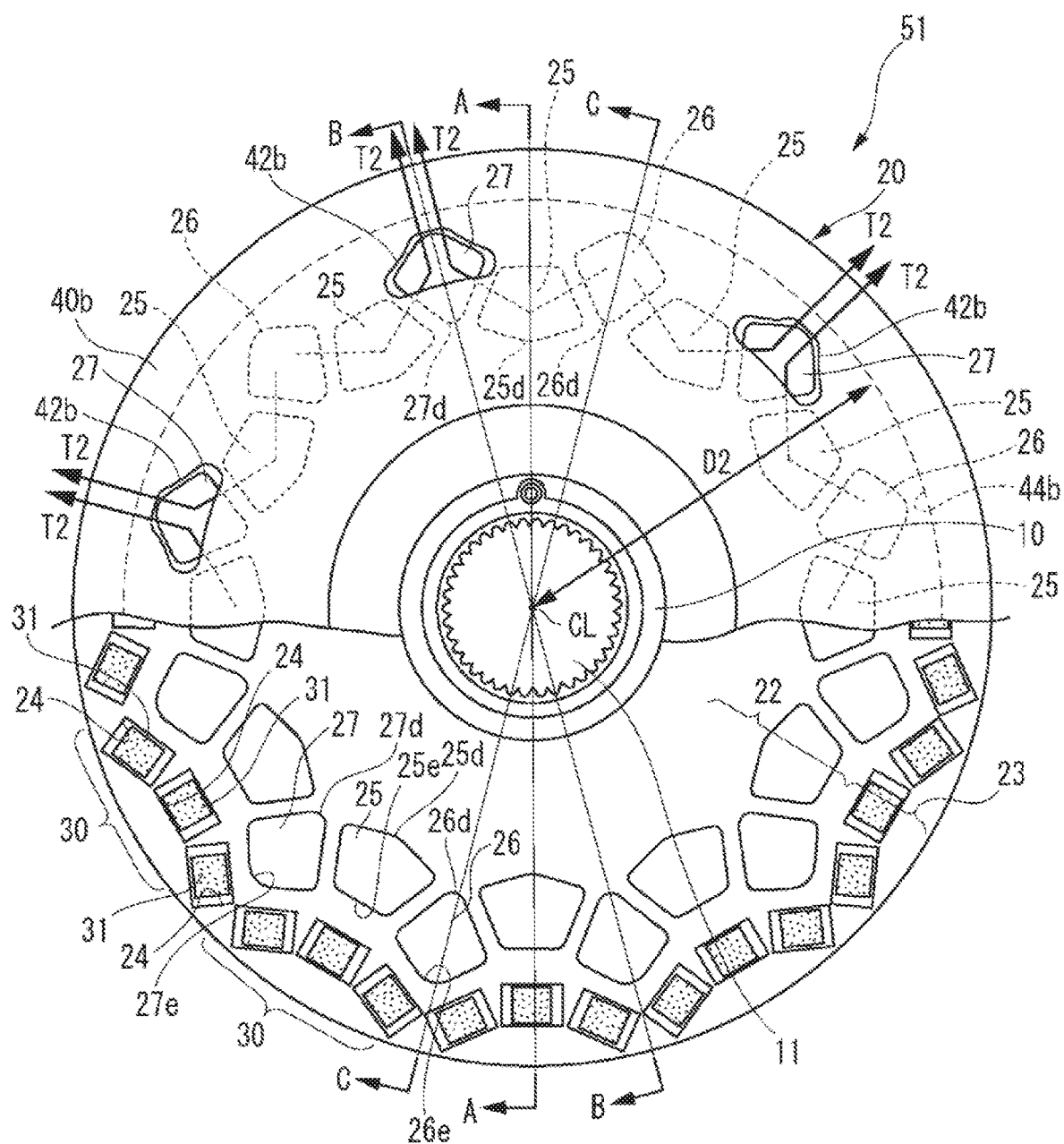
FIG. 3 is a rear view of the rotor of the rotating electric machine according to the first embodiment, with a part of a second end plate cut away.
Figure 5:
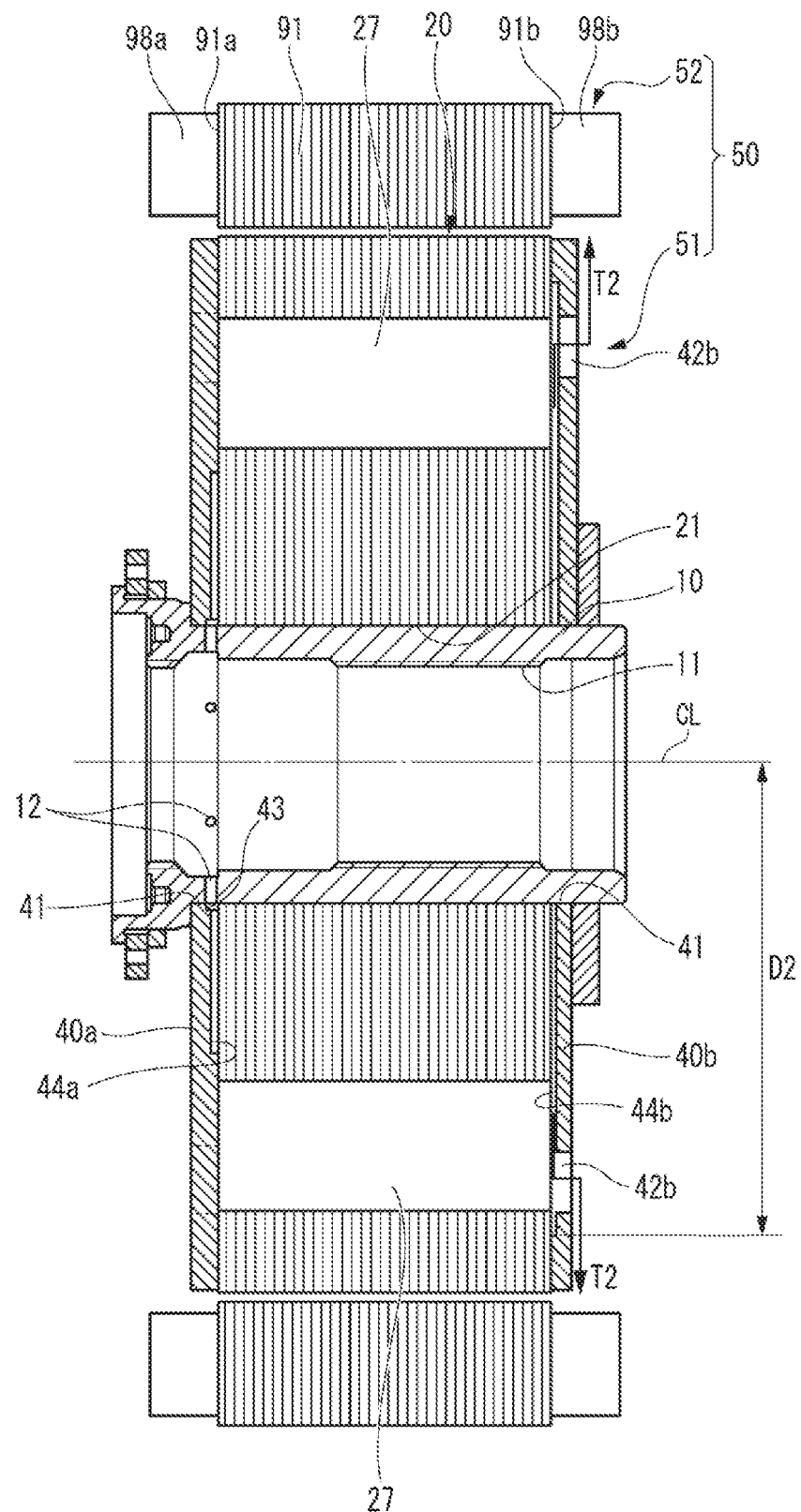
FIG. 5 is a cross-sectional view taken along the line B-B in FIGS. 2 and 3.

The refrigerant flowing through the first refrigerant flow path hole 25 is supplied to the second refrigerant discharge hole 42b of the second end plate 40b through the second groove portion 44b as indicated by the arrow T2 in FIGS. 3 and 5 and supplied to the second refrigerant flow path hole 26 of the rotor core 20 through the second groove portion 44b as indicated by the arrow T3 in FIG. 6. The first refrigerant discharge hole 42a (second refrigerant flow path hole 26) and the second refrigerant discharge hole 42b are alternately arranged in the circumferential direction when viewed from the axial direction and the first refrigerant flow path hole 25 is arranged between the first refrigerant discharge hole 42a (second refrigerant flow path hole 26) and the second refrigerant discharge hole 42b. Therefore, the refrigerant flowing through the first refrigerant flow path hole 25 is distributed substantially evenly into the second refrigerant flow path hole 26 and the second refrigerant discharge hole 42b. Therefore, a part of the refrigerant supplied to the first refrigerant flow path hole 25 flows through the rotor core in one direction in the axial direction and the remaining refrigerant flowing through the first refrigerant flow path hole 25 flows through the rotor core in one direction in the axial direction and then flows back in an opposite direction. Since the outer diameter side apex portion 26e of the second refrigerant flow path hole 26 is located further on a radially outer side than the outermost diameter portion 25e of the first refrigerant flow path hole 25, it is easy to guide the refrigerant to the second refrigerant flow path hole 26.

The refrigerant supplied to the second refrigerant discharge hole 42b of the second end plate 40b is discharged from the second refrigerant discharge hole 42b and supplied to the second coil end 98b.

The refrigerant flowing through the second refrigerant flow path hole 26 in the axial direction from the second end plate 40b side to the first end plate 40a side cools the magnet 31 disposed in each magnetic pole portion 30.

The refrigerant flowing through the second refrigerant flow path hole 26 is discharged from the first refrigerant discharge hole 42a of the first end plate 40a and supplied to the first coil end 98a as indicated by an arrow T4 in FIGS. 2 and 6.

Therefore, the rotor core 20 can be cooled from the inside by the refrigerant supplied to the first refrigerant flow path hole 25 and the second refrigerant flow path hole 26 and the first coil end 98a and the second coil end 98b can be cooled by the refrigerant discharged from the first refrigerant discharge hole 42a and the second refrigerant discharge hole 42b.

Although the embodiment of the invention is described above, the invention is not limited to the embodiment described above and modifications, improvements, and the like can be made as appropriate. For example, in the embodiment described above, the third refrigerant flow path hole 27 may not be provided.

The specification describes at least the following matters. Although the components or the likes which correspond in the embodiment described above are shown in a parenthesis, it is not limited to this.

(1) A rotating electrical machine (rotating electrical machine 50) which includes a rotor (rotor 51) and a stator (stator 52) arranged radially outside of the rotor in which the rotor includes a rotor shaft (rotor shaft 10) including a refrigerant flow path (refrigerant flow path 11) inside of the rotor shaft, a rotor core (rotor core 20) including a rotor shaft hole (rotor shaft hole 21) through which the rotor shaft is inserted, a plurality of magnet insertion holes (magnet insertion holes 24) provided along a circumferential direction, and a first refrigerant flow path hole (first refrigerant flow path hole 25) and a second refrigerant flow path hole (second refrigerant flow path hole 26) penetrating in an axial direction, a plurality of magnetic pole portions (magnetic pole portions 30) constituted of magnets (magnets 31) inserted into the magnet insertion holes, a first end plate (first end plate 40a) arranged on a first axial end side of the rotor core, and a second end plate (second end plate 40b) arranged on a second axial end side of the rotor core, opposite to the first axial end side, the stator includes a first coil end (first coil end 98a) located radially outward of the first end plate, and a second coil end (second coil end 98b) located radially outward of the second end plate, the first end plate includes, a first refrigerant discharge hole (first refrigerant discharge hole 42a) communicating with the second refrigerant flow path hole, and a first groove portion (first groove portion 44a) which supplies refrigerant supplied from the refrigerant flow path to the first refrigerant flow path hole and does not supply the refrigerant to the first refrigerant discharge hole and the second refrigerant flow path hole, and the second end plate includes, a second refrigerant discharge hole (second refrigerant discharge hole 42b), and a second groove portion (second groove portion 44b) which supplies the refrigerant supplied from the first refrigerant flow path hole to the second refrigerant flow path hole and supplies the refrigerant to the second refrigerant discharge hole.

According to (1), the first groove portion of the first end plate supplies the refrigerant supplied from the refrigerant flow path to the first refrigerant flow path hole without supplying the refrigerant to the first refrigerant discharge hole and the second refrigerant flow path hole. Therefore, the rotor core can be cooled from the inside by the refrigerant flowing through the first refrigerant flow path hole.

Since the second groove portion of the second end plate supplies the refrigerant supplied from the first refrigerant flow path hole to the second refrigerant discharge hole, the refrigerant discharged from the second refrigerant discharge hole is supplied to the second coil end. Since the second groove portion of the second end plate also supplies the refrigerant supplied from the first refrigerant flow path hole to the second refrigerant flow path hole, the rotor core can also be cooled from the inside by the refrigerant flowing through the second refrigerant flow path hole.

Since the first refrigerant discharge hole on the first end plate communicates with the second refrigerant flow path hole, the refrigerant flowing through the second refrigerant flow path hole is discharged from the first refrigerant discharge hole and supplied to the first coil end.

Therefore, the rotor core can be cooled from the inside by the refrigerant supplied to the first refrigerant flow path and the second refrigerant flow path and the first coil end and the second coil end can be cooled by the refrigerant discharged from the first refrigerant discharge hole and the second refrigerant discharge hole.

(2) The rotating electrical machine according to (1), in which an outer diameter side end portion (outer diameter side apex portion 26e) of the second refrigerant flow path hole is located further on a radially outer side than an outermost diameter portion (outermost diameter portion 25a) of the first refrigerant flow path hole.

According to (2), the outer diameter side end portion of the second refrigerant flow path hole is located further on the radially outer side than the outermost diameter portion of the first refrigerant flow path hole, so that the refrigerant can be easily guided to the second refrigerant flow path hole.

(3) The rotating electrical machine according to (1) or (2), in which the first refrigerant discharge hole is provided to overlap the second refrigerant flow path hole in the circumferential direction, a plurality of the first refrigerant discharge holes and a plurality of the second refrigerant flow path holes are provided at equal intervals in the circumferential direction, a plurality of the second refrigerant discharge holes are provided at equal intervals in the circumferential direction, the first refrigerant discharge holes and the second refrigerant discharge holes are alternately arranged in the circumferential direction, and the first refrigerant flow path holes are disposed between the first refrigerant discharge holes and the second refrigerant discharge holes in the circumferential direction.

According to (3), the first refrigerant discharge holes and the second refrigerant discharge holes are alternately arranged in the circumferential direction when viewed from the axial direction and the first refrigerant flow path holes are arranged between the first refrigerant discharge holes and the second refrigerant discharge holes. Therefore, the refrigerant flowing through the first refrigerant flow path holes can be distributed substantially evenly into the second refrigerant flow path holes (first refrigerant discharge holes) and the second refrigerant discharge holes.

(4) The rotating electrical machine according to (3), in which the rotor core further includes third refrigerant flow path holes (third refrigerant flow path hole 27) penetrating in the axial direction, and the second refrigerant discharge holes are provided to overlap with the third refrigerant flow path holes in the circumferential direction.

According to (4), the second refrigerant discharge holes are provided to overlap with the third refrigerant flow path holes provided in the rotor core in the circumferential direction. Therefore, in the circumferential direction, the first to third refrigerant flow path holes can be arranged in a balanced manner inside the rotor core.

The invention claimed is:

1. A rotating electrical machine comprising a rotor and a stator arranged radially outside of the rotor, wherein the rotor comprises:

a rotor shaft including a refrigerant flow path inside of the rotor shaft;

a rotor core including a rotor shaft hole through which the rotor shaft is inserted, a plurality of magnet insertion holes provided along a circumferential direction, and a first refrigerant flow path hole and a second refrigerant flow path hole penetrating in an axial direction;

a plurality of magnetic pole portions constituted of magnets inserted into the magnet insertion holes;

a first end plate arranged on a first axial end side of the rotor core; and a second end plate arranged on a second axial end side of the rotor core, opposite to the first axial end side;

the stator comprises:

a first coil end located radially outward of the first end plate; and a second coil end located radially outward of the second end plate, the first end plate comprises;

a first refrigerant discharge hole communicating with the second refrigerant flow path hole; and a first groove portion which supplies refrigerant supplied from the refrigerant flow path to the first refrigerant flow path hole and does not supply the refrigerant to the first refrigerant discharge hole and the second refrigerant flow path hole, and the second end plate comprises:

a second refrigerant discharge hole; and a second groove portion which supplies the refrigerant supplied from the first refrigerant flow path hole to the second refrigerant flow path hole and supplies the refrigerant to the second refrigerant discharge hole.

2. The rotating electrical machine according to claim 1, wherein an outer diameter side end portion of the second refrigerant flow path hole is located further on a radially outer side than an outermost diameter portion of the first refrigerant flow path hole.

3. The rotating electrical machine according to claim 1, wherein the first refrigerant discharge hole is provided to overlap the second refrigerant flow path hole in the circumferential direction, a plurality of the first refrigerant discharge holes and a plurality of the second refrigerant flow path holes are provided at equal intervals in the circumferential direction, a plurality of the second refrigerant discharge holes are provided at equal intervals in the circumferential direction, the first refrigerant discharge holes and the second refrigerant discharge holes are alternately arranged in the circumferential direction, and the first refrigerant flow path holes are disposed between the first refrigerant discharge holes and the second refrigerant discharge holes in the circumferential direction.

4. The rotating electrical machine according to claim 3, wherein the rotor core further comprises third refrigerant flow path holes penetrating in the axial direction, and the second refrigerant discharge holes are provided to overlap with the third refrigerant flow path holes in the circumferential direction.

* * * * *